(12) United States Patent
Malchow et al.

(10) Patent No.: US 9,485,439 B2
(45) Date of Patent: Nov. 1, 2016

(54) SHORTWAVE INFRARED CAMERA WITH BANDWIDTH RESTRICTION

(71) Applicant: Sensors Unlimited, Inc., Princeton, NJ (US)

(72) Inventors: Douglas Stewart Malchow, Lawrence, NJ (US); Peter Dixon, Lawrenceville, NJ (US); Robert Rozploch, Newtown, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 286 days.

(21) Appl. No.: 14/171,859

(22) Filed: Feb. 4, 2014

(65) Prior Publication Data

US 2015/0156426 A1 Jun. 4, 2015

Related U.S. Application Data

(60) Provisional application No. 61/911,116, filed on Dec. 3, 2013.

(51) Int. Cl.
*H04N 5/33* (2006.01)
*G02B 5/20* (2006.01)

(52) U.S. Cl.
CPC ............... *H04N 5/33* (2013.01); *G02B 5/208* (2013.01)

(58) Field of Classification Search
CPC ...... H04N 5/33; G02B 5/208; G01R 31/311; A61L 27/16
See application file for complete search history.

(56) References Cited

U.S. PATENT DOCUMENTS

| | | | |
|---|---|---|---|
| 8,018,509 B2 | 9/2011 | Numata | |
| 8,462,238 B2 | 6/2013 | Fredembach et al. | |
| 8,558,890 B2 | 10/2013 | Mrozek et al. | |
| 2004/0169749 A1 | 9/2004 | Acharya | |
| 2005/0002028 A1* | 1/2005 | Kasapi | G01R 31/311 356/328 |
| 2007/0146512 A1 | 6/2007 | Suzuki et al. | |
| 2007/0272836 A1 | 11/2007 | Higashitsutsumi et al. | |
| 2007/0278406 A1 | 12/2007 | Haug | |
| 2008/0087800 A1 | 4/2008 | Toda | |
| 2010/0022678 A1* | 1/2010 | Yakimicki | A61L 27/16 522/161 |
| 2013/0258187 A1* | 10/2013 | Park et al. | H04N 5/2254 348/374 |

FOREIGN PATENT DOCUMENTS

| | | |
|---|---|---|
| WO | 0054217 A2 | 9/2000 |
| WO | 2012143927 A1 | 10/2012 |

OTHER PUBLICATIONS

Hansen, M. P.; Malchow, D. S.; Overview of SWIR Detectors, Cameras, and Applications, in Thermosense XXX, (ed. Vavilov, V. P., Burleigh, D. D.) Proceedings—SPIE The International Society for Optical Engineering; 2008, 6939:69390I (AN RN232672004).*

(Continued)

*Primary Examiner* — Sath V Perungavoor
*Assistant Examiner* — Philip Dang
(74) *Attorney, Agent, or Firm* — Carlson, Gaskey & Olds, PC

(57) ABSTRACT

A camera comprises an image plane for capturing shortwave infrared wavelengths. The image plane captures only a portion of a shortwave infrared wavelength band, and excludes other wavelengths. A method of designing a camera is also disclosed.

11 Claims, 2 Drawing Sheets

(56) References Cited

OTHER PUBLICATIONS

Malchow, D. S.; Brubaker, R. M.; Hansen, M. P.; Development of Linear Array ROIC for InGaAs Detector Arrays with Wavelength Response . . . , in Infrared Technology and Applications XXXIV, (ed. Andresen, B. F., Fulop, G. F., Norton, P. R.) Proceedings—SPIE The International Society for Optical Engineering; 2008, 6940(Part 2):69402V (AN RN233113023).*

Sensors Unlimited; Sensors Unlimited's InGaAs SWIR cameras feature advanced dynamic range enhancements, Jul. 2, 2010, published by Vision System, (http://www.vision-systems.com/articles/2010/07/sensors-unlimiteds-ingaas-swir-cameras-feature-advanced-dynamic-range-enhancements.html).*

Xenics; SWIR Cameras; Jan. 20, 2012, published by Photonics.com (http://www.photonics.com/Product.aspx?PID=6&VID=99&IID=586&PRID=49800).*

Microsanj, "Comparing Thermoreflectance (TTI), Infrared (IR), Near Infrared Emission (EMMI), and Optical Beam Induced Resistance Change (OBIRCH) Imaging Techniques", Microsanj LLC, Aug. 2013.*

C.H. Kruger, "Annual Scientific Report on Investigation of Infra-Red and Nonequilibrium Air Radiation" Prepared for National Aeronautics and Space Administration for the Period May 1, 1994 to Feb. 28, 1995, NASA.*

European Search Report for European Patent Application No. 14194938.8 mailed Jan. 9, 2015.

* cited by examiner

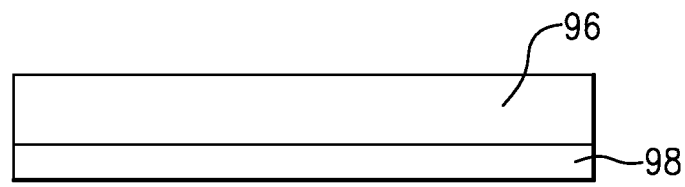
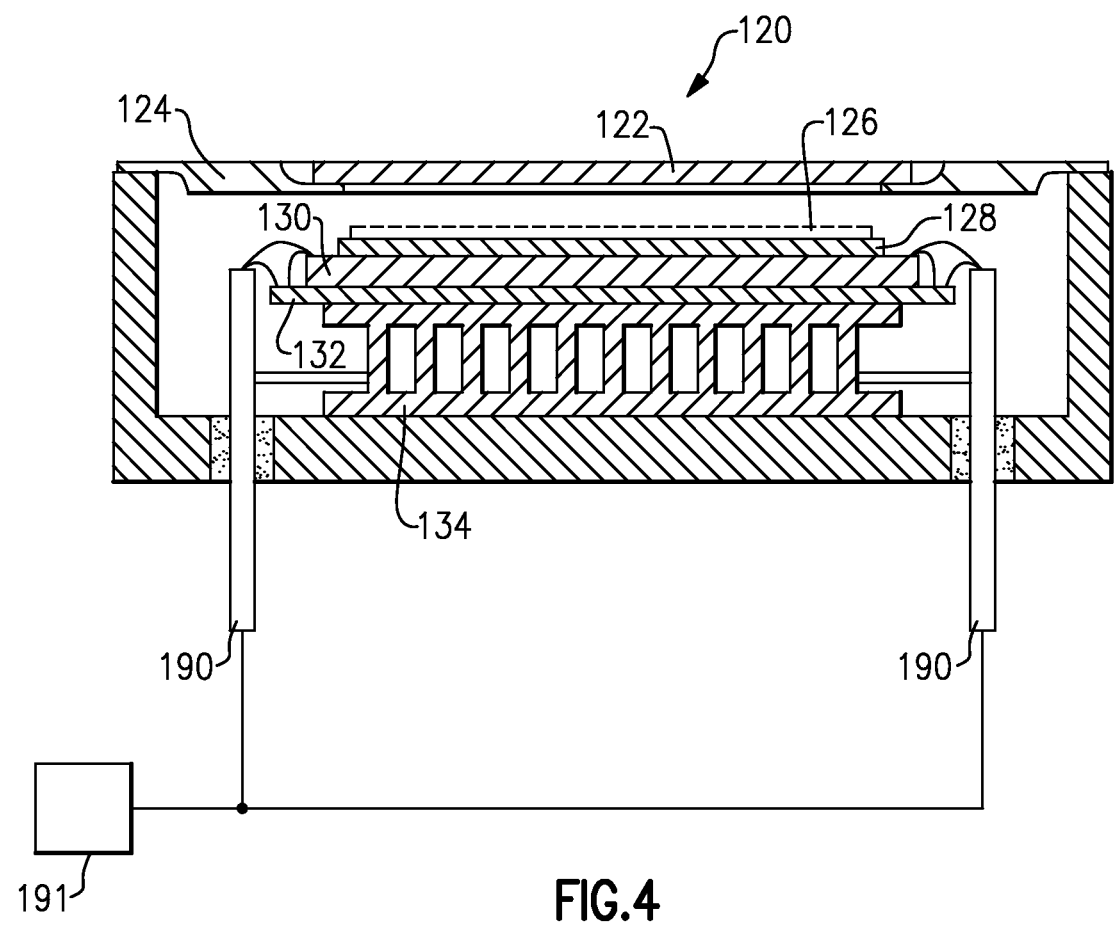

SHORTWAVE INFRARED CAMERA WITH BANDWIDTH RESTRICTION

RELATED APPLICATION

This application claims priority to U.S. Provisional Application No. 61/911,116, filed Dec. 3, 2013.

BACKGROUND OF THE INVENTION

This application relates to a camera for capturing images in a shortwave infrared bandwidth wherein modifications are made to eliminate capture of certain portions of the shortwave infrared bandwidth.

Various camera systems are known and utilized for any number of applications. One type of camera has an image detecting device which may be a photo-voltaic photo diode. These cameras are known to capture images in what is known as the shortwave infrared (SWIR) bandwidth. This may also be known in some applications as "near infrared." A capture bandwidth for such cameras may be between about 0.9 and 1.7 microns.

Such cameras have particularly good application in capturing images in situations where normal visual light images would be compromised. As an example, night vision cameras may operate across this bandwidth. When such cameras are used for night vision systems on commercial land vehicles such as cars, buses and trucks, the full range of such SWIR bandwidth is not needed.

SUMMARY OF THE INVENTION

A camera comprises an image plane for capturing shortwave infrared wavelengths. The image plane captures only a portion of a shortwave infrared wavelength band, and excludes other wavelengths. A method of designing a camera is also disclosed.

These and other features may be best understood from the following drawings and specification.

BRIEF DESCRIPTION OF THE DRAWINGS

FIG. 3 shows another embodiment.
FIG. 4 shows yet another embodiment.

DETAILED DESCRIPTION

Figure 1:
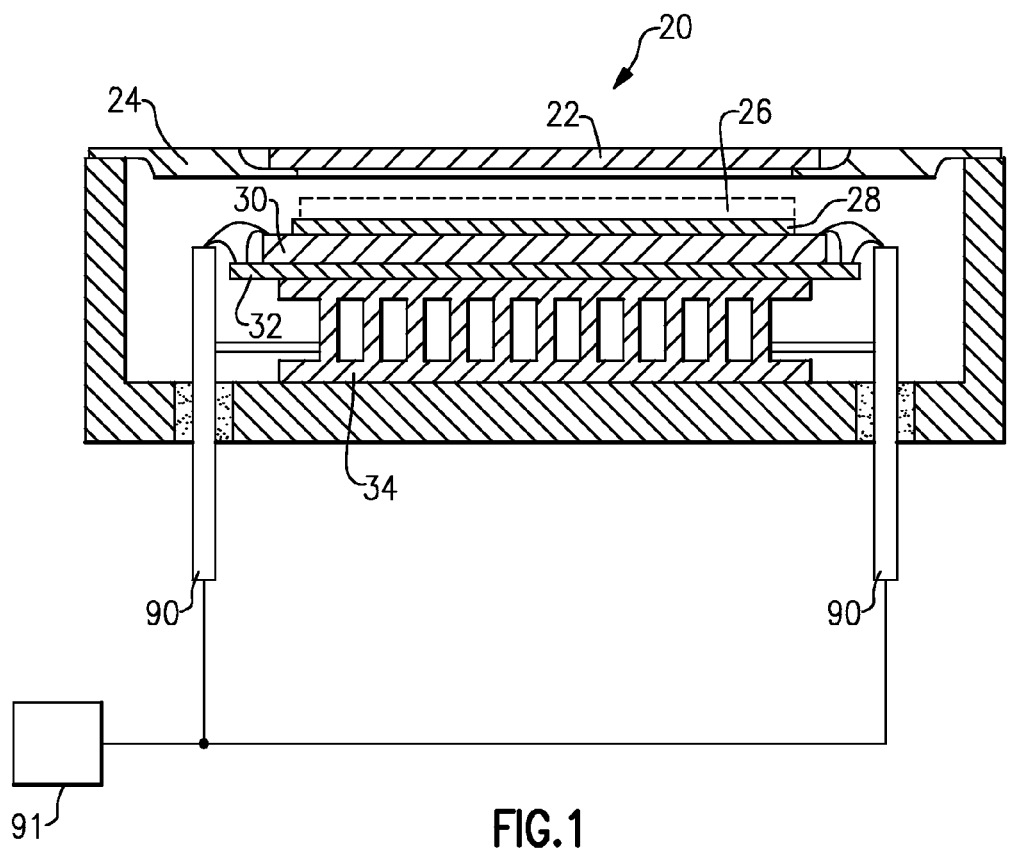
FIG. 1 shows an embodiment.

FIG. 1 illustrates a camera 20 having an outer window 22 received in a housing 24 which may be formed of an appropriate metal such as a nickel alloy. An image plane 28 and a silicone readout inlet circuit 30, along with a printed wiring board 32 together form a focal plane array of photo-voltaic photo diodes. In one embodiment, the image plane 28 may be formed of a semiconductor compound including both indium arsenide and gallium arsenide. Cameras that use such image planes may be known as InGaAs cameras. A thermal electric cooling sink 34 is positioned to capture heat. Input/output pins 90 communicate with a controller 91 which can evaluate and store images captured by camera 20, as known.

Figure 2:
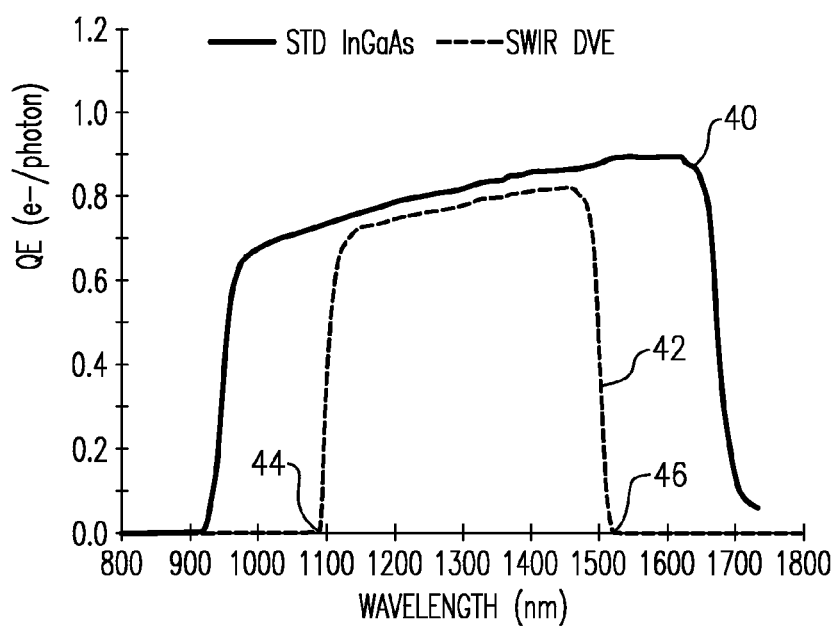
FIG. 2 shows a feature of FIG. 1 embodiment.

FIG. 2 shows a standard bandwidth of capture 40 for a shortwave infrared camera.

The cameras have typically been designed to capture the entire bandwidth range of about 0.9-1.7 microns.

The camera of FIG. 1 is provided with a filter 26 which acts to limit the bandwidth of the shortwave infrared bandwidth which will reach the image plane 28. As shown in this embodiment, the filter 26 is placed directly on the image plane 28.

The filter 26 may be any interference or dichroic bandwidth filter or any other appropriate filter capable of filtering the bandwidth of shortwave infrared light that reaches the image plane 28. The filter 26 may be a simple filter coating applied directly to the surface of the image plane 28 or may be a separate filter which is attached to the plane.

FIG. 3 shows yet another embodiment wherein a filter 98 is attached directly to the window 96 which may operate much like the window 22 in the camera 20.

Dichroic filters and how they can be applied to various surfaces are known and within the skill of a worker in this art given the goals of this application as follows.

Returning to FIG. 2, the filter may limit the shortwave infrared bandwidth which reaches the image plane 28 such as shown at 42 in FIG. 2. Now, a shorter end 44 of the capture bandwidth 42 is approximately 1.1 microns while a longer end 46 is just above about 1.5 microns.

When such cameras are used for night vision systems on commercial land vehicles such as cars, buses and trucks, the full range of the SWIR bandwidth is not needed. Instead, only the range 42 between about 0.9 and 1.5 microns is needed.

FIG. 4 shows an embodiment 120 wherein there may not be a filter. Rather, the image plane 128 is modified such that it is only sensitive to the bandwidths such as bandwidth 42.

As an example, it is known that the long wave cut-off point for a standard photo detector is associated with the ratio of indium arsenide to gallium arsenide. A worker of ordinary skill in the art given the teachings of this application would know how to modify that ratio such that the bandwidth 42 is all that is captured and not the entire bandwidth 40.

This alteration may create a crystal lattice mismatch of an absorbing layer to a substrate which could result in non-uniformities. Thus, it may be preferred to add phosphide to an absorbing layer making it a compound that alters a bandwidth to a shorter bandwidth while also maintaining a lattice matched to the substrate. Aluminum may also be used rather than phosphide.

A first layer of the detecting structure in the image plane 130 passes light through before hitting a detection layer. The first layer can be modified to remove its normal absorbing cut-out from the approximately 0.9 current prior art of the bandwidth 40 closer to the 1.1 micron wavelength. One can do this by increasing the thickness, such that the combination prevents photons short of 1.1 microns from reaching the detecting layer. These first layer changes can be combined with the changes mentioned above to a detector bandwidth such that the bandwidth 42 will be achieved.

Detectors can be designed for front illumination where the light reaches the detection layer through the top surface or back illumination where the light travels through the back-side or substrate layer. The embodiments mentioned above can be applied either design.

Finally, returning to FIG. 1, the modifications to the image plane 128, as mentioned with regard to FIG. 4, can also be utilized in combination with the filter structure of FIG. 1. For this reason, an optical filter 126 is shown in FIG. 4.

The use of both of these features will result in a camera that is unlikely to actually capture a wavelength in the excluded bands between the bandwidth 42 and the bandwidth 40.

While an example of the excluded wavelengths is illustrated outside of band 42 in FIG. 2, it should be understood that lesser wavelengths may be excluded, or more could be excluded. In one embodiment, the camera excludes wavelengths that are shorter than 1.0 microns. In a narrower embodiment, the excluded wavelengths include wavelengths shorter than approximately 1.1 microns. In embodiments, the excluded wavelengths also exclude wavelengths longer than 1.6 microns, and more narrowly wavelengths that are longer than approximately 1.5 microns.

A filter such as described above, can also be manufactured to have one or more notch filters layered together to exclude specific wavelengths. These could be assembled in any of the locations described above.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A camera comprising:
   an image plane for capturing shortwave infrared wavelengths, with a band of said shortwave infrared wavelengths being defined across a range of 0.9-1.7 microns;
   said image plane capturing only a portion of a shortwave infrared wavelength band, and excluding other wavelengths;
   said image plane excluding wavelengths at both a shorter end of the shortwave infrared wavelength band and wavelengths at a longer end of the shortwave infrared wavelength band; and
   said excluded wavelengths including wavelengths shorter than about 1.0 microns, and said excluded wavelengths including wavelengths longer than 1.5 microns.

2. The camera as set forth in claim 1, wherein said excluded wavelengths include wavelengths shorter than approximately 1.1 micron.

3. The camera as set forth in claim 1, wherein said camera includes a filter material for excluding said excluded wavelengths.

4. The camera as set forth in claim 3, wherein said filter is placed directly on said image plane.

5. The camera as set forth in claim 3, wherein said filter is a filter coating applied on said image plane.

6. The camera as set forth in claim 5, wherein said image plane is altered such that it only captures images in said portion of said shortwave infrared wavelength band and excludes said excluded wavelengths.

7. The camera as set forth in claim 6, wherein said image plane includes a semiconductor compound including indium arsenide and gallium arsenide and a ratio of said indium arsenide to said gallium arsenide is designed to exclude longer ones of said other wavelengths.

8. The camera as set forth in claim 6, wherein at least one of a phosphide and aluminum may be adding to an absorbing layer to exclude shorter ones of said other wavelengths.

9. The camera as set forth in claim 3, further comprising a housing for said camera including a window, and said filter is placed on said window.

10. The camera as set forth in claim 1, wherein said image plane is altered such that it only captures images in said portion of said shortwave infrared wavelength band and excludes said excluded wavelengths.

11. A method of designing a camera including the steps of:
   a) providing an image plane for capturing shortwave infrared wavelengths, with a band of shortwave infrared wavelengths being defined across a range of 0.9-1.7 microns; and
   b) designing said camera such that said image plane captures a portion of a shortwave infrared wavelength band, and excludes other wavelengths, with the exclusion being achieved by providing a filter to filter said excluded other wavelengths, and/or by modifying the image plane such that it only captures said portion of said shortwave infrared wavelength bands, said image plane excluding wavelengths at both a shorter end of the shortwave infrared wavelength band and wavelengths at a longer end of the shortwave infrared wavelength band, and said excluded wavelengths including wavelengths shorter than about 1.0 microns, and said excluded wavelengths including wavelengths longer than 1.5 microns.

* * * * *